Patented Feb. 22, 1927.

1,618,413

UNITED STATES PATENT OFFICE.

GEORGE HOLLAND ELLIS, OF SPONDON, NEAR DERBY, ENGLAND, ASSIGNOR TO AMERICAN CELLULOSE AND CHEMICAL MANUFACTURING COMPANY LIMITED, A CORPORATION OF DELAWARE.

DYEING OR COLORING OF PRODUCTS MADE WITH CELLULOSE ACETATE.

No Drawing. Application filed September 25, 1923, Serial No. 664,780, and in Great Britain January 27, 1923.

This invention relates to the dyeing which term also includes printing and stencilling of artificial yarns or threads, filaments, fabrics, films or other products made of or containing cellulose acetate.

According to the invention, coloring matters or organic compounds which have an affinity for cellulose acetate or are capable of coloring the same, but which are insoluble, practically insoluble or of relatively low solubility in water, all of which are hereinafter included in the expression relatively water-insoluble organic compounds capable of coloring cellulose acetate are applied for the dyeing of threads, filaments, fabrics, films or other products such as referred to, by employing them in the form of solubilized, i. e. soluble or more soluble modifications, obtained by pretreating them with bodies having oily or fatty characteristics, containing salt-forming groups capable of forming soluble salts with alkalies or ammonia, for example the sulpho group or the carboxyl group or both sulpho and carboxyl groups, or salts of such bodies, such for instance as their sodium or other alkali salts or ammonium salts. Such bodies and their salts are hereinafter included in the term body of oily or fatty characteristics. In particular one can employ sulphoricinoleic acid or other sulphonated fatty acids or salts thereof of such as referred to, but other bodies of oily or fatty characteristics may be employed, such as oleic, stearic or palmitic acid, or salts thereof such for instance as the sodium or other alkali salts or ammonium salts. Mixtures of two or more than two of any of the aforesaid solubilizing agents may be employed.

The invention may especially be employed for dyeing cellulose acetate with non-sulphonated or other insoluble or relatively insoluble organic compounds or coloring matters of the "azo" class. It may likewise be employed for dyeing cellulose acetate by the azoic or development process with simple amino bases other than amino azo coloring matters, or by any other coloring matters or compounds having an affinity for or capable of coloring cellulose acetate, but the use of which by the ordinary methods is impracticable or difficult owing to their insolubility or low solubility in water, such for example as unreduced coloring matters of the substituted quinone mono-imide series generally comprised within the term indophenols; or coloring matters or compounds of the following classes usually containing no sulpho groups:—diphenylmethane, triphenylmethane, triarylmethane, oxazine, azine, diazine, thiazine, unreduced indigoid, or basic derivatives of the anthraquinone series; as instances may be mentioned, rosaniline base, alkylated or arylated rosaniline bases, pararosaniline base, tetra-methyl-dipara-amidotriphenyl carbinol (malachite green base), amido anthraquinones and amidohydroxyanthraquinones or their derivatives, such as 1-hydroxy-4-paratolyl-amino-anthraquinone, 1-paratolyl-amino-4-methyl aminoanthraquinone safranine base, and so forth.

With reference to the dyeing with the simple amino bases (other than amino azo coloring matters) by the azoic or development process, that is to say wherein the actual dyestuff is produced on the cellulose acetate fibre or material by the development method of formation with the aid of said bases and of azoic development, it is understood that the expression "organic compounds capable of coloring cellulose acetate" employed in the present description and in the claims applies to the said simple amino bases in the sense that they are capable of coloring the cellulose acetate by such production of a dye thereon, whether or not the simple amino bases themselves colour cellulose acetate. It is further understood as indicated later, that in the dyeing by the azoic or development process the solubilized modifications of the simple amino bases may be employed either in the first or impregnating bath of the process or in the final "development" bath or in both baths.

It is known that the affinities of acetyl cellulose for various coloring matters are largely influenced by the chemical groups comprised in the constitutions of the molecules of the coloring matters, the groups: azo, amino, imino, imide, nitro, nitroso, isonitroso, hydroxyl, acidyl-amino, being favourable. For example, it may be stated that the group —NH$_2$ and its alkyl substituents, and the group —N=N— are very favourable, the groups —NO$_2$ and —OH are somewhat favourable, but the group —SO$_3$H is very unfavourable to the fixation of the coloring matter by the acetyl cellulose material.

The inhibitive influence of the strongly acidic —SO$_3$H group limits the utility of many of the existing commercial coloring matters, particularly of the "azo" class, since most of these contain this group, in the absence of which from the molecule the dyestuff would in most cases be insoluble or of such low solubility in water as to be useless of practical application. For this reason many coloring matters of the "azo" class have formerly been synthesized within the acetyl cellulose material by the process of dyeing one soluble component upon the material, diazotizing the component, and treating the diazo compound with a solution of a suitable second component, such as a phenolic or amino body of the benzene or naphthalene series.

It has now been found that the dyeing of cellulose acetate in thread, fabric, film or other form can be effected with any constitutionally suitable, but insufficiently soluble compounds or coloring matters of the "azo" class, if the said compounds or coloring matters are applied in the form of soluble modifications made by treating them with one or more of the bodies of oily or fatty characteristics and in particular with sulphoricinoleic or other sulphonated fatty acids or their salts.

The said compounds or coloring matters of the "azo" class (which class as is known includes azo compounds whether mono-azo, disazo, trisazo, tetrakisazo and others), while being without strongly acidic groups, such as the SO$_3$H group, may, or may not contain in their molecule, besides the favourable —N=N— group, primary or secondary or tertiary amino groups, such as the alkylated or arylated amino groups, or substituent groups such as nitro, chlor, ethoxy, methoxy.

When the said azo compounds or coloring matters contain primary amino groups and are diazotizable, they may be diazotized and developed within the acetyl cellulose material by coupling with suitable developers such as phenolic or amino bodies of the benzene and naphthalene series.

The following are examples of "azo" compounds and coloring matters which may be applied according to the process.

A.

Certain amino-azo-benzene substituent derivatives.

Viz:
(a) Nitro-
(b) Di-nitro-
(c) Methyl nitro-
(d) Dimethyl-nitro-
(e) Methoxy-
(f) Chlor-methoxy-
(g) Nitromethoxy-
(h) Ethoxy-
(i) Chlor-ethoxy-
(j) Nitro-ethoxy-
(k) Chlor-nitro- I.—Aminoazobenzenes
II.—Monomethylamino-azo benzenes
III.—Dimethylamino azo benzenes
IV.—Mono-ethylamino azo benzenes
V.—Diethylamino azo benzenes
VI.—Ethylmethylamino azo benzenes
VII.—Monophenylaminoazo benzenes
VIII.—Phenylmethylamino azo benzenes
IX.—Phenylethylamino azo benzenes
X.—Aminomonomethyl azo benzene
XI.—Aminodimethyl azo benzene made by diazotizing the [(a) to (k)] substituted anilines, and combining with (I) aniline, or with (II) to (VI) alkylated or dialkylated anilines, or with (VII) arylated aniline or with (VIII) and (IX) alkylarylated anilines, or with (X) metatoluidine, or with (XI) para-xylidine.

B.

Benzene azo naphthylamines and certain of their substituent derivatives.

Viz:
(a) Benzene-azo
(b) Chlor-benzene-azo-
(c) Nitro-benzene-azo-
(d) Chlor-nitrobenzene-azo-
(e) Dinitro-benzene-azo-
(f) Methyl-benzene-azo-
(g) Dimethyl-benzene-azo-
(h) Methyl-nitrobenzene-azo-
(i) Dimethyl-nitrobenzene-azo-
(j) Methoxy-benzene-azo-
(k) Chlormethoxy-benzene-azo-
(l) Nitromethoxy-benzene-azo-
(m) Ethoxybenzene-azo-
(n) Chlor-ethoxy-benzene-azo-
(o) Nitro-ethoxy-benzene-azo I.—
II.—Monomethyl-
III.—Dimethyl-
IV.—Mono-ethyl-
V.—Diethyl-
VI.—Methyl-ethyl-
VII.—Mono-phenyl-
VIII.—Diphenyl-
IX.—Methyl-phenyl-
X.—Ethyl-phenyl- (i) alpha naphthylamines and (ii) beta naphthylamines made by diazotizing [(a) to (o)] aniline or the substituted anilines and combining with (I) (i) alphanaphthylamine, or with the (II to VI) (i) alkylated or dialkylated alphanaphthylamines, or with (VII to X) (i) arylated, diarylated or alkylarylated alphanaphthylamines, or with (I) (ii) betanaphthylamine, or with the (II to VI) (ii) alkylated or dialkylated betanaphthylamines, or with the (VII to X) (ii) arylated, diarylated or alkylarylated betanaphthylamines.

C.

Napthalene-azo-anilines and certain of their substituent derivatives.

Viz:
(a) Naphthalene 1:azo-
(b) Chlornaphthalene 1:azo-
(c) Nitronaphthalene 1:azo-
(d) Naphthalene 2:azo-
(e) Chlornaphthalene 2:azo-
(f) Nitronaphthalene 2:azo- I.—
II.—Monomethyl-
III.—Dimethyl-
IV.—Monoethyl-
V.—Diethyl-
VI.—Methyl-ethyl-
VII.—Monophenyl-
VIII.—Phenylethyl-
IX.—Phenylmethyl-
X.—Metatoluidine
XI.—Para-xylidine -anilines made by diazotizing (a) alphanaphthylamine or (d) beta-naphthylamine or (b) and (c) the chlor- and nitro- substituted alphanaphthylamines, or (e) and (f) the chlor- or nitro- substituted beta naphthylamines, and combining with (I) aniline or (II to VI) the alkylated or dialkylated anilines, or (VII to IX) with arylated or alkylarylated anilines, or (X) with meta-toluidine, or (XI) with para-xylidine.

D.

*Amino-azonaphthalenes and certain of their substituent derivatives.*

Viz.:
(a) alpha-amino
(b) alpha-monomethylamino-
(c) alpha-dimethylamino-
(d) alpha-monoethylamino-
(e) alpha-diethyl amino-
(f) alpha-methylethyl amino-
(g) alpha-monophenylamino-
(h) alpha-diphenylamino-
(i) alpha-phenyl methylamino-
(j) alpha-phenyl ethyl amino-
(k) beta-amino-
(l) beta-monomethylamino-
(m) beta-dimethyl amino-
(n) beta-monoethyl amino-
(o) beta-diethyl amino-
(p) beta-methyl-ethyl amino-
(q) beta-monophenylamino-
(r) beta-diphenyl amino-
(s) beta-phenyl-methylamino-
(t) beta-phenyl-ethyl amino- -azo- { I. Naphthalenes
II. Chlornaphthalenes
III. Nitronaphthalenes } made by diazotizing (I) alpha and beta naphthylamines or (II) chlor-alpha and chlor-beta naphthylamines, or (III) nitro-alpha and nitrobeta naphthylamines, and coupling with [(a) to (f)] alpha-naphthylamine or the alkylated or dialkylated alpha naphthylamines or with [(g) to (j)] arylated, diarylated or alkylarylated alpha naphthylamines, or with [(k) to (p)] beta-naphthylamine or the alkylated or dialkylated beta naphthylamines, or with [(q) to (t)] arylated, diarylated or alkylarylated beta naphthylamines.

The following, for instance, are some examples of azo coloring matter which may be applied according to the invention:—

E.

| Coloring matter | Shade yielded |
|---|---|
| Benzene-azo-benzene-azo-betanaphthol (Sudan III) | Orange. |
| Naphthalene-azo-alphanaphthol (Sudan brown) | Apricot. |
| Para-aminobenzene-azo-dimethylaniline | Yellow. |
| Naphthalene-azo-dimethylaniline | Golden yellow. |
| Metanitro-benzene-azo-dimethylaniline | Yellow gold. |
| Para-nitro-benzene-azo-dimethylaniline | Salmon red. |
| Benzene-azo-benzene-azo-dimethylaniline | Peach. |
| 4 : nitro 2 : methoxy-benzene 1 : azo dimethylaniline | Red. |
| Amido-azo-naphthalene | Yellow. |
| (Yields on subsequent diazotization and development on the material: With beta-oxynaphthoic acid—navy blue. With dimethylaniline—rust. With resorcine—mahogany red). | |
| 4 : nitro 2 : methoxybenzene-1 : azo-diphenylamine | Red. |

As before indicated one can also apply the invention for the dyeing of cellulose acetate materials by the azoic or development method with simple amino bases. Such bases are for example paranitraniline, metanitraniline, benzidine, dianisidine, dimethylaniline, and alphanaphthylamine and diphenylamine. The solubilized modifications produced by treating such base or bases with the sulphonated fatty acid or salt or other bodies of oily or fatty characteristics as referred to may be used either in the first "dyeing" or impregnating bath, or in the final "developing" bath or in both baths. The advantages of this method of performing azoic dyeing or coloring of acetyl cellulose is that level dyeing and penetration are promoted, and fastness to rubbing is often greatly improved, while in the dyeing of mixed goods, such as mixtures of cotton and acetyl cellulose, the danger of damage to the cotton by the use of mineral acids is obviated. Furthermore certain amino bases which do not form in the ordinary way, salts sufficiently soluble or stable to be possible of easy application, may now be used, or their use improved, e. g. diphenylamine.

In carrying out the invention, the organic compounds or coloring matters having an affinity for or capable of dyeing acetyl cellulose may be dissolved in the body or bodies of oily or fatty characteristics and be afterwards added to the dye baths. Some of the coloring matters or compounds for instance dissolve easily direct in the alkali or ammonium salt of sulphoricinoleic or other sulphonated fatty acid; others are best dissolved in the free sulphonated fatty acid. Solution may be effected by simply stirring up the dyestuff with the acid or salt, heating if necessary. The mass can be afterwards diluted with water or aqueous alkali, boiled and filtered through cloth into the dyebath, which may be acid, neutral or alkaline. Dyeing can be conducted in the usual manner.

As another instance of the use of non-sulphonated bodies of oily or fatty characteristics, one may obtain useful pinks and red shades in cellulose acetate yarns or fabrics by treating 4-nitro-2-methoxybenzene-1-azo-diethylaniline with enough oleic acid to dissolve it on heating, then pouring the hot oily solution into hot water containing sufficient ammonia or soda to neutralize the acid and afterwards filtering the solution into the dye bath and conducting the dyeing as usual.

If the compound or coloring matter applied according to the process contains free primary amino groups and is diazotizable, it may be diazotized and developed on the material in the customary manner to form a further dyestuff or dyestuffs.

In the case of simple amino bases to be applied by the azoic process, the base or mixture of bases may be simply made into a paste with a sufficiency of body or bodies of oily or fatty characteristics, and heated till solution is complete, water being added to dilute as desired, and the solution, after filtering if required, being added to the dyebath; dyeing or developing can then be conducted as usual.

It is of course understood that mixtures of different coloring matters or organic compounds of the character hereinbefore referred to may be applied in the form of modifications solubilized or rendered more soluble by the solubilizing bodies of oily or fatty characteristics. Also that mixtures of such solubilizing bodies may be employed for solubilizing any of the compounds or coloring matters to be applied according to the invention.

Other coloring matters which are not deleteriously affected by the sulphonated fatty acid or salt or other body of oily or fatty characteristics may, when desired, be dyed on to the material together with the coloring matters or compounds of the character before indicated.

The compounds or coloring matters to be applied according to the invention may if desired be made into solid "solutions" or complexes or other concentrated preparations suitable for transport and subsequent dissolving and application, by heating them with the body or bodies of oily or fatty characteristics such as referred to—for example oleic, stearic, palmitic or sulphoricinoleic acid, etc. or their salts either by treatment in presence of little or no water, or by treatment in presence of larger quantities of water with subsequent concentration or drying. For example the preparations may be made by heating the organic compound or compounds or coloring matter or coloring matters with the body or bodies of oily or fatty characteristics and neutralizing or mixing while hot, with alkalies or ammonia as such, or in saturated or nearly saturated solutions. Or the coloring matters or compounds may be dissolved direct in the hot alkali salt or ammonium salt of the fatty or oily body, or "soap" to give a solid solution or complex or concentrated preparation on cooling, and, where necessary drying. To dye the acetyl cellulose material the solid solution or complex made as above may be simply dissolved in hot water, the resultant solution being added to water in a suitable vessel and the dyeing be conducted as usual.

It is understood that the invention also extends to the dyeing of "mixed" fabrics or materials containing cellulose acetate associated with cotton, silk, wool or other threads or fibres with any of the classes of organic compounds, coloring matters or simple amido bases herein referred to.

In particular it has been found that a large number of organic compounds of the azo class, in the molecule of which the other substituent groups such as the amino, alkylated or arylated amino, nitro, chlor, ethoxy, methoxy, may or may not be present, but from which the sulpho group —$SO_3H$ is absent, are capable of dyeing fibres, filaments or yarns of acetyl cellulose in preference to those of cotton, wool, silk, or artificial silks of the so-called "cellulose type" or unesterfied cellulose. They may thus be used for the dyeing of mixed yarns, fabrics or materials consisting of acetyl cellulose and one or more of the latter fibres, either in uniform shades or in contrasting colours, since a large number of dyestuffs exist which are capable of dyeing wool, silk, cotton or artificial silks of the so-called cellulose type in preference to acetyl cellulose. Examples of compounds or coloring matters suitable for the acetyl cellulose for this purpose are the azo compounds or coloring matters hereinbefore referred to. For their application they are made into soluble modifications by treatment with sulphoricinoleic or other sulphonated fatty acids, or salts of said acids, or with the other bodies of oily or fatty characteristics, as above referred to.

By way of example, in dyeing mixed goods, a quantity of one or more of the azo compounds or coloring matters, appropriate to the percentage of acetyl cellulose in the mixed material, may be dissolved, in the form of their solubilized modifications in the dye bath and dyeing be proceeded with in the usual manner. Where the several dyestuffs or compounds and the requisite assistants are compatible and will mix together without deleterious effect the suitable coloring matter or coloring matters for the other fibre or fibres may be added to the same bath. Where this is not possible these other fibres may be first selectively dyed by the application of suitable dyestuffs, and the acetyl cellulose be afterwards dyed selectively as above, or vice versa.

Where the azo compound contains a primary amino group and is capable of diazotization, it may be diazotized and developed on the material with any suitable developers either prior to or subsequently to the application of the silk, wool, cotton, or other coloring matter; or such other coloring matter may also be capable of diazotization and development at the same time. In this manner a series of very fast and deep shades may be produced.

The invention may also be applied for dyeing such mixed materials by the azoic method, by treatment with bases, e. g. simple bases such as paranitraniline, metanitraniline, benzidine, dianisidine or alpha-naphthylamine, diazotizing and developing in suitable developing baths; or by treatment with bases such as diamethyl aniline, diethylaniline or diphenyl amine and treatment in suitable diazo solutions. In such cases also, the sulphonated fatty acids or their salts or the other bodies of oily or fatty characteristics will be employed to form soluble modifications of the bases, whether these are employed in the first or impregnating bath or in the second or "developing" bath or in both baths. The other fibre or fibres associated with the cellulose acetate may be dyed with other dyes in any known or suitable way.

Instead of dyeing the mixed goods in uniform shades or in contrasting colours the cellulose acetate portion may be dyed, leaving undyed the other fibre or one or more other fibres associated therewith.

This invention is likewise applicable to the printing or stencilling of threads, fabrics, or materials consisting of acetyl cellulose alone or associated with other fibres or materials. For this purpose, in applying the compounds, coloring matters or primary amido bases having an affinity for acetyl cellulose, suitable amounts of their modifications obtained by treating them with sulphonated fatty acids or other bodies of oily or fatty characteristics, as above referred to, may be dissolved in water, thickened with substances such as starch, gums, dextrin, flour and the like, and the pastes thus formed be applied to the material consisting of or containing acetyl cellulose by printing from rollers, blocks, etc., or by stencilling, the material being then dried. The drying is often sufficient to fix the coloring matter, compound or primary amido base well enough in other cases the material may be subjected to a short treatment with steam or "ageing". The printed or stencilled material may be washed or not as desired, and be finished as may be necessary; or where the compounds, coloring matters or organic bases used are suitable for or require diazotization and development, the printed or stencilled material may be so treated for the production of a very large variety of shades.

Mixtures of different organic compounds, coloring matters or simple amino bases, or any of them, may of course be applied by printing or stencilling according to the invention.

In regard to the class of dyestuffs of the substituted quinone monoimide series included within the term indophenols, it has been found that these are very useful for acetyl cellulose, many of the members of the class having very good direct affinity or dyeing properties for it and yielding shades, e. g. blues and violets, which are not easily attainable with simple azo coloring matters. The results, moreover, are often very resistant to light and soaping.

Generally it will be understood that in dyeing, printing or stencilling of materials consisting of or containing cellulose acetate, with the solubilized modifications of any of the organic compounds, coloring matters or bases favourably constituted or having an affinity for cellulose acetate as referred to, other dyes may or may not be employed in combination or association with them in the same operation, or in separate operations, for the production of compound shades on the acetyl cellulose.

The practical application of the invention may be illustrated by the following examples, it being understood that these are given only as instances and can be varied widely.

*Example 1.*—To dye an orange shade on 100 kilos of cellulose acetate yarn in the hank.

1 kilo of finely ground paranitrobenzene azo diphenyl amine

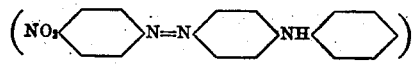

are well stirred or ground with 10 litres of sodium salt of sulphoricinoleic acid (50%); the mixture is heated under an open steam pipe and then diluted with boiling water and further boiled. The liquor is then filtered into a dye bath containing cold, soft water. 100 kilos of the material is introduced and dyeing carried out as usual, the temperature being raised to 60° or 75° C. as may be necessary to exhaust. Volume of dye bath about 30:1 calculated on the weight of the acetyl cellulose. The hanks are afterwards rinsed and finished and dried as desired.

*Example 2.*—To dye a gold shade on 25 kilos of acetyl cellulose knitted fabric.

250 grams of benzene azo naphthalene azo phenol

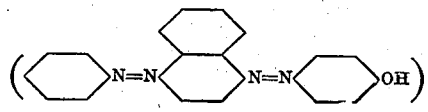

are stirred into 5 litres of sodium salt of sulphoricinoleic acid (50%) and the mixture heated under an open steam pipe. Water is added and the whole is boiled. The liquor is then filtered into the suitable dye machine containing cold, soft water. The goods are entered and worked in the usual manner, the temperature being raised as required to bring to the desired shade. Volume of dye bath about 30:1 reckoned on the weight of the goods. The fabric is then washed off in water and finished and dried as requisite.

*Example 3.*—To dye a shade of scarlet on 100 kilos of acetyl cellulose yarn in hank by the azoic process.

1.5 kilos of amino-azo-benzene base are mixed and heated with 15 litres of sodium salt of sulphoricinoleic acid (50%); the mixture is diluted and boiled as in the previous examples and filtered into the dye bath containing cold, soft water. The goods are then entered and worked, the temperature being raised until the bath is exhausted. Volume of dye bath about 30:1 reckoned on the weight of the goods. The goods are then rinsed and worked for 30 minutes in a fresh bath containing hard water in which are dissolved 5 kilos of sodium nitrite (98%) and 17.5 litres of hydrochloric acid of 17.7° Bé. Volume of bath about 30:1 reckoned on the weight of the goods The goods are then rinsed and developed in a further bath of the same volume, containing soft water into which has been filtered a solution made by pouring 3 kilos of dimethylaniline into 20 litres of sodium salt of sulphoricinoleic acid (50%) and heating, then diluting with water and boiling.

Development is performed cold for 1 hour, after which the goods are removed, rinsed, soaped, dried and finished as may be desired.

*Example 4.*—To dye a brilliant bluish red on 100 kilos of acetyl cellulose yarn in the hank.

2 kilos of rosaniline base are dissolved in 15 litres of sodium salt of sulphoricinoleic acid (50%) by stirring and heating. The mass is then diluted with hot water and boiled if required, and is filtered into a dye bath containing soft water at 45° C. Volume of bath about 30:1 reckoned on the weight of the goods. The goods are then entered and worked, the temperature being subsequently raised to 60° C. until the desired depth of shade is obtained. The goods are then removed, rinsed, and finished and dried as desired.

*Example 5.*—To dye a blue shade on 25 kilos of acetyl cellulose fabric.

3 kilos of diethyl para amido phenyl 1:4 naphthoquinone monoimide (33% paste)

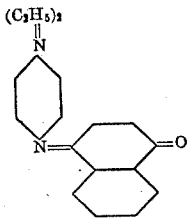

are well mixed with 15 litres of 50% sodium salt of sulphoricinoleic acid which has previously been heated to 100° C. After about 10 minutes the mass is diluted with boiling water and the whole is filtered into the dye machine containing cold, soft water. Volume of dye bath about 30:1 on the weight of the fabric. The fabric is entered and worked as usual, the temperature being raised and dyeing continued until the desired depth of shade is produced. The fabric is then removed, rinsed, and dried and finished as desired.

*Example 6.*—To dye a bluish red on the acetyl cellulose weft and a blue shade on the cotton warp of a mixed woven fabric weighing 25 kilos and containing 50 per cent of each material.

Stir 250 grams of finely powdered 2:4-dinitrobenzene-1-azo-diethylaniline

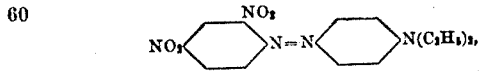

into 5 litres of 50% sodium salt of sulphoricinoleic acid at 100° C. for 10 minutes. Dilute with boiling water, boil further, and filter the whole into the dyeing machine containing cold, soft water. Volume of dye bath about 30:1 reckoned on the weight of the fabric. Enter the goods and work as usual, raising the temperature until the desired shade is produced on the weft. Rinse the material in fresh warm water and prepare a fresh dye liquor containing 375 grams of chlorazol fast blue 2B. Enter the goods into this bath and work as usual, raising the temperature until the desired shade of blue is obtained on the warp. Finally rinse, soap if required, and dry and finish as may be requisite.

What I claim and desired to secure by Letters Patent is:

1. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising a body of oily or fatty characteristics.

2. In and for the dyeing of threads, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising a higher fatty acid compound.

3. In and for the dyeng of yarns, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising a sulphonated higher fatty acid compound.

4. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising a salt of a higher fatty acid compound.

5. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising a salt of a sulphonated higher fatty acid.

6. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising a sulphonated ricinoleic acid body.

7. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising a salt of sulphoricinoleic acid.

8. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a solubilizing agent comprising sodium salt of sulphoricinoleic acid.

9. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising a body of oily or fatty characteristics.

10. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising a higher fatty acid compound.

11. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising a sulphonated higher fatty acid compound.

12. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising a salt of a higher fatty acid compound.

13. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising a salt of a sulphonated higher fatty acid.

14. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising a sulphonated ricinoleic acid body.

15. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising a salt of sulphoricinoleic acid.

16. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a solubilizing agent comprising sodium salt of sulphoricinoleic acid.

In testimony whereof I have hereunto subscribed my name.

GEORGE HOLLAND ELLIS.